United States Patent [19]

Halstead et al.

[11] Patent Number: 5,129,144

[45] Date of Patent: Jul. 14, 1992

[54] METHOD OF MAKING A COMBINATION RADIATOR AND CONDENSER APPARATUS FOR MOTOR VEHICLE

[75] Inventors: Gary A. Halstead, Lockport; Ronald C. Treloar, Williamsville, both of N.Y.

[73] Assignee: General Motors Corporation, Detroit, Mich.

[21] Appl. No.: 638,889

[22] Filed: Jan. 8, 1991

Related U.S. Application Data

[62] Division of Ser. No. 540,015, Jun. 19, 1990, Pat. No. 5,009,262.

[51] Int. Cl.$^5$ .................. B21D 53/00; B21K 29/00; B23P 15/26
[52] U.S. Cl. ..................... 29/890.035; 29/890.07; 29/890.054
[58] Field of Search ............... 29/890.032, 890.035, 29/890.052, 890.054, 890.07, 726, 727, 726.5

[56] References Cited

U.S. PATENT DOCUMENTS

| | | |
|---|---|---|
| 1,640,037 | 8/1927 | Johnson . |
| 1,794,135 | 2/1931 | Bancel ..................... 165/140 X |
| 3,228,461 | 1/1966 | Seekins ..................... 29/890.07 X |
| 3,310,868 | 3/1967 | La Poste et al. ............ 29/890.054 X |
| 3,411,196 | 11/1968 | Zehnder ..................... 29/890.054 X |
| 3,411,316 | 11/1968 | Wright ........................ 62/507 X |
| 3,689,972 | 9/1972 | Mosier et al. ............... 29/890.054 |
| 4,510,991 | 4/1985 | Kawahira ..................... 62/507 X |
| 4,651,816 | 3/1987 | Struss et al. ................. 165/140 X |
| 4,876,778 | 10/1989 | Hagihara et al. ............ 29/890.054 X |
| 4,932,469 | 6/1990 | Beatenbough ................. 29/890.07 X |
| 4,945,635 | 8/1990 | Nobusue et al. ............. 29/890.054 X |

FOREIGN PATENT DOCUMENTS

8204308 12/1982 World Int. Prop. O. ...... 29/890.052

Primary Examiner—Timothy V. Eley
Assistant Examiner—C. Richard Martin
Attorney, Agent, or Firm—Ronald L. Phillips

[57] ABSTRACT

A combination radiator and condenser apparatus has a pair of extruded tank and header assemblies adapted to be connected in both a coolant system for liquid cooled engine and a refrigerant system of an automobile air conditioning system. The assemblies each include an extruded tank with two compartments separated by an internal partition which extends the full height of the tank and each extruded tank further includes a slotted wall for receiving the ends of a plurality of unitary extruded fluid flow tubes extending between each extruded tank and each of the unitary extruded fluid flow tubes have first and second passages therein connected respectively to the coolant chamber and the high pressure refrigerant chamber of each of the extruded tanks; and a stop is provided in each of the tanks to position the flow tubes to space the inlets therein in a spaced relationship with the extruded tank walls; the extruded tubes can be of alternative designs including two separate extruded tubes, two separate fabricated tubes, or a combination of extruded or fabricated tubes rather than a common extrusion for connection respectively to the coolant chamber and the high pressure refrigerant chamber.

3 Claims, 7 Drawing Sheets

METHOD OF MAKING A COMBINATION RADIATOR AND CONDENSER APPARATUS FOR MOTOR VEHICLE

This is a division of application Ser. No. 07/540,015 filed on Jun. 19, 1990, now U.S. Pat. No. 5,009,262.

FIELD OF THE INVENTION

This invention relates to a method for assembling devices for cooling engine coolant and refrigerant vapor in a motor vehicle having a liquid cooled engine and an air conditioning system and further to a method for assembling combination radiator and condenser apparatus having parallel tube passes and more particularly to such apparatus of the type having air centers for directing the inlet air stream of the vehicle through separate tube passes in separate radiator and condenser portions of the combination radiator and condenser apparatus.

BACKGROUND OF THE INVENTION

Motor vehicle cooling systems for cooling engine coolant, refrigerant vapor and transmission oil are known in which either an oil cooler or a refrigerant condenser unit are located upstream of the cooling air inlet side of the radiator for removing heat from the coolant system for an liquid cooled engine. Examples of such systems are set forth in U.S. Pat. Nos. 3,479,834 and 4,138,857.

Such location exposes the tube passes of the refrigerant condenser and/or oil cooler to ram air flow as the vehicle is driven in a forward direction. Furthermore, such location causes the engine fan to draw cooling air across the condenser while the vehicle is stopped or slow moving and the engine is idling. As a consequence the condenser is operative to condense refrigerant gas to a liquid which is then directed across an expansion valve for controlling the flow of refrigerant into a refrigerant evaporator. A circulating fan draws air flow across the evaporator for cooling the interior or passenger compartment of a motor vehicle in a known manner. Likewise a continual flow of cooling air is directed across the oil cooler.

While the forward or upstream location of the refrigerant condenser is a favorable location for providing continual air flow across the tube passes of the condenser and/or oil cooler, such refrigerant condensers and oil coolers have separate air centers and the radiator has separate air centers which can cause undesirable contraction, expansion, contraction cycles in the inlet airstream for cooling the separate components of combination radiator and condenser apparatus for motor vehicles. Such pressure cycles in the inlet airstream result in an increased pressure drop that will reduce the cooling effectiveness of the inlet airstream of the vehicle.

In the past such reduction in cooling effectiveness has been compensated by providing a slightly oversized frontal area in the radiator or the condenser could be located laterally of he radiator so as not to retard air flow therethrough. An example of a laterally offset condenser is set forth in U.S. Pat. No. 3,337,596.

Present vehicle design constraints have reduced the available space for such oversized radiators or for such offset condenser configurations.

Additionally, in future automobile air conditioning systems high cost alternative refrigerants are being proposed. In order to minimize the amount of such refrigerant required to effectively cool a vehicle engine compartment it will desirable to reduce the size of the condenser to reduce the total volume of refrigerant in the system but without reducing the cooling capacity of the condenser.

Furthermore, present day radiators often include a plastic coolant tank which are joined to metal headers and support frames in which are located tube passes and air centers for flowing the inlet air stream of a vehicle for removing heat from coolant passing through the tube passes. Header and tube construction are used in the manufacture of refrigerant condensers having high pressure refrigerant flowing through tube passes connected to air centers having the inlet air stream of the vehicle directed therethrough for cooling the refrigerant vapor for condensation to high pressure liquid refrigerant. Partitions are provided in the header tank condenser to provide a serpentine fluid flow path through the condenser. Both the radiator and the condenser are separately manufactured and separately mounted either laterally of one and other or with the condenser located upstream of the radiator. Such arrangements increase the space and weight requirements of the combination apparatus. One approach to weight containment has been to strengthen the header portion of either a radiator or a condenser by providing a dome in the header to reinforce tube openings therein. Another approach has been to provide a condenser with a tube header with spaced slots therein to receive the ends of parallel tube passes and partitions for forming a serpentine condenser pattern. Neither of the proposals suggest a unitary construction which combines both a radiator for coolant and a condenser for high pressure refrigerant.

In prior combination radiator and condenser apparatus no solution has been proposed which will enable a condenser and a radiator to be located in limited space confines of a motor vehicle without adversely affecting the flow of coolant air flow across one or both of the separate condenser and radiator units.

In order to meet space and weight design constraints and inlet airstream flow patterns in a motor vehicle an object of the present invention is to provide a combined radiator and condenser apparatus in which fewer parts are used than in separately fabricated radiator and condenser units. A further object is to provide such a combination apparatus in which thin gage aluminum centers are common for both the radiator and the condenser and each of the radiator and condenser units share a common tank member and common header plates. A feature of the invention is to improve the packaging of combined radiator and condenser apparatus by eliminating an expansion gap between the condenser and the radiator such that the radiator and condenser can be mounted to the vehicle as one unit rather than as two separate units thereby to eliminate the weight of one mounting unit. An extruded tank has an integral internal partition which separates the extruded tank into a coolant chamber and a high pressure refrigerant chamber and wherein the tube passes of both the radiator and the condenser are bonded to an integral wall of the extruded tank at tube access slots therein and wherein the tubes have the same air centers for defining a single air flow path through both the radiator and the condenser which will not increase the pressure drop across the radiator and condenser as the inlet airstream of a motor vehicle is directed thereacross. The extruded radiator configuration provides greater strength and enables more robust designs to be configured than in the case of designs including plastic tank with rubber gasket seal sets as found in present day radiator assemblies.

SUMMARY OF THE INVENTION

An object of the invention is to provide an easily assembled, light weight combination radiator and condenser apparatus which combines the radiator and condenser into a common unit with unitized components.

Accordingly one feature of the present invention is a combination radiator and condenser apparatus for a motor vehicle in which an extruded header has a coolant space and a high pressure refrigerant vapor space respectively adapted to be connected in an engine coolant circuit and a mechanical refrigerant circuit of an automobile air conditioning system and wherein a plurality of extruded tubes are connected between each the extruded headers for forming a first set of tube passes for coolant and a second set of tube passes for refrigerant vapor and wherein a set of air centers is located between each of said first and second sets of tubes for receiving the inlet air stream of the vehicle for cooling both the radiator and the condenser as an inlet airstream of a vehicle is directed thereacross.

A further feature of the present invention is provide an extruded combination radiator and condenser tank having a smaller volume condenser chamber for high pressure refrigerant flow and wherein the total cross-sectional flow area through the high pressure refrigerant space in the condenser chamber is balanced to the total cross-sectional flow area of the condenser tube passes so as to eliminate throttling of high pressure refrigerant flow between the condenser tank of the combination radiator and condenser tank and the condenser tube passes.

Another feature of the present invention is to provide a combination radiator and condenser apparatus for a motor vehicle in which extruded tanks having an integral internal partition dividing the tanks into a coolant space or chamber and into a high pressure refrigerant space or chamber and wherein each of the chambers have a plurality of unitary tube passes arranged to have both coolant flow and refrigerant flow therethrough both of which flow patterns are cooled by air flow across a single set of air centers which are common to both the radiator and the condenser and which have substantially the same frontal flow area for receiving inlet air stream of the vehicle without causing increases in pressure drop by contraction, expansion and contraction pressure cycles in the inlet air stream of the vehicle.

A further feature of the present invention is to provide the combination radiator and condenser apparatus of the preceding summary paragraph and wherein the radiator and condenser apparatus includes a pair of spaced extruded headers each having an internal partition forming a coolant space and a high pressure refrigerant space adapted to be connected, respectively, in an engine coolant circuit and a mechanical refrigerant circuit of an automobile air conditioning system; and wherein the tube passe have a notched end sealed to the internal partition.

Still another feature of the present invention is a combination radiator and condenser apparatus for a motor vehicle having a liquid cooled engine and an engine driven compressor in a refrigerant system for the vehicle in which high pressure refrigerant vapor from the compressor discharge is cooled by the condenser and coolant for the engine is cooled by the radiator and in which shared common tube passes are provided having both coolant and refrigerant passages and wherein a pair of extruded headers have integral separate coolant and high pressure refrigerant spaces adapted to be connected, respectively, in an engine coolant circuit and a mechanical refrigerant circuit of an automobile air conditioning system and wherein the integral extruded headers are connected to opposite ends of the tube passes for connecting them to the respective coolant and high pressure refrigerant spaces therein.

Another feature is to provide such tube passes formed as common tubes having multiple reinforcing webs in both the coolant passage and the refrigerant passage.

Still another feature is to provide such tube passes in which the multiple reinforcing webs are only formed in the refrigerant passages for reinforcing the tube segment forming the refrigerant passage to contain high pressure refrigerant.

Yet another feature is to provide such tube passes as unitary tubes formed either as extrusions wherein the reinforcing webs are integrally formed; or formed as sheet metal fabricated tubes with reinforcing web inserts Yet another object of the invention is to provide such tube passes with two separated tubes for respectively forming the coolant passage and the refrigerant passage and wherein the two separate tubes are either extruded tubes, sheet metal fabricated tubes or a combination of an extruded tube and a sheet metal fabricated tube.

Yet another object of the present invention is to provide an extruded tank as set-forth in the preceding summary wherein wall portions thereof forming the coolant chamber have a reduced thickness for containing low pressure coolant and the second wall portions thereof forming the high pressure refrigerant chamber; the second wall portions integrally formed with the coolant chamber wall portions and having a greater thickness than the thickness of the coolant chamber wall portions for reinforcing against the high pressure refrigerant contained thereby.

Still another object of the present invention is to provide an extruded tank as set-forth in the preceding summary wherein the extruded tank has slots formed in the header for insertion of partitions in the coolant chamber for providing serpentine refrigerant flow through the coolant passages in the tube passes.

Another object of the present invention is to provide an extruded tank as set-forth in the preceding summary wherein the extruded tank has a flow area therein balanced with respect to the flow area of the tube passes connected thereto to prevent flow throttling between the extruded tank and the tube passes and to reduce the total volume in the combination radiator and condenser apparatus which is filled with refrigerant.

Another aspect of the present invention is to provide an extruded tank as set-forth in the preceding summary wherein the extruded tank has an integral header with slots at the opposite ends thereof and wherein a three sided pocket is cold extruded in the walls of the extruded tank for receiving end closure members which have a cladding thereon which is brazed to the three sided pocket and at the slots to prevent leakage out end openings of the extruded tank.

Still another object of the present invention is to provide an extruded tank as set-forth in the preceding summary wherein a header wall is curved to provide an optimum burst strength for containing high pressure refrigerant in the refrigerant chamber of the extruded tank and to do so by providing header radii in the range of 20-60 mm.

Still another object of the present invention is to provide an extruded tank as set-forth in the preceding summary wherein the extruded tank has an integral segment thereof located in the coolant chamber forming a plurality of oil cooler tubes adapted to be connected in an engine oil system for cooling engine oil during engine operation.

Still another object of the present invention is to provide an improved method for assembly a combination radiator and condenser assembly in which an extrudable material is forced through an extruding die to form a pair of elongated members each having open ends with a longitudinal internal partition separating the elongated member into two chambers facing a header wall and wherein the chambers each communication with the open ends; applying hydraulic pressure to the two chambers and piercing a plurality of tube slots in the header wall, a pair of end closure slots in the header wall and a plurality of multi pass partition slots in the header wall only at the header wall portion which forms one of the chambers; precutting a plurality of tube lengths and inserting the tube lengths into the tube slots of a pair of spaced elongated members; inserting end closures in the end closure slots to close the open ends and inserting partitions in the multi pass partition slots to divide one of the chambers to form a serpentine flow path in tube lengths connected to the one of the chambers.

Another feature of the invention is to seal the joined parts in the preceding object by the step of providing a cladding on each of the joined parts and brazing them to form a sealed brazed joint therebetween.

Yet another feature of the invention is to provide the methods set forth in the preceding summary wherein the three surfaces of the inner wall of the extruded tank are cold extruded to form a three sided pocket for each of the partitions and each of the end closures and only brazing the exposed end to form a sealed joint between the header and the joined parts.

Another object of the present invention is to provide a simplified easily assembled unitary combination radiator and condenser apparatus having a set of air centers for simultaneously air cooling refrigerant gas and coolant liquid flow without increasing pressure drop thereacross caused by contraction, expansion and contraction pressure cycles in the inlet airstream of the vehicle as it is directed through air centers for cooling the tube passes of the apparatus wherein a pair of extruded headers are provide each having a coolant chamber and a high pressure refrigerant chamber adapted to be connected, respectively, in an engine coolant circuit and a mechanical refrigerant circuit of an automobile air conditioning system and to opposite ends of tube passes having opposite ends thereon slidably fit within tube openings in the pairs of extruded headers.

A further object of the present invention is to provide for combination apparatus as set forth in the preceding object in which tube passes are connected to the same air centers and wherein tube passes are formed with axially aligned condenser tube segments and radiator tube segments having passages for flow of refrigerant vapor and a passage for flow of engine coolant and wherein each of flows are cooled by flow of the inlet air stream of the vehicle through the same air centers.

A further object of the present invention is to provide the combination apparatus of the preceding object wherein the tube passes are unitary tubes having both refrigerant flow and coolant flow through each of the unitary tubes.

A further object of the present invention is to provide the combination apparatus of the preceding object in which the unitary tube passes have an integral divider web therein forming said first and second passages.

A further object of the invention is to provide a combination radiator and condenser apparatus for motor vehicles having unitary tubes with the same air centers and wherein the unitary tubes have an integral divider web therein forming separate refrigerant flow and coolant flow passages and wherein opposite ends of each of the unitary tubes are slidably received in an indexed relationship within the coolant space and the high pressure refrigerant space of an extruded header for ease of assembly.

A further object of the invention is to provide the apparatus of the preceding object wherein the pairs of headers have cold extruded pockets therein and a channel groove to receive edges of separator plates and end caps for forming the separate coolant space and the separate high pressure refrigerant space.

A further object of the present invention is to provide an extension on the end of each of a plurality of tube passes for communication of spaced coolant and refrigerant passages therein with the coolant space or the refrigerant vapor return header space by the provision of an extension on the end of the tube passes for forming an inlet to the coolant passage; and by the further provision of an extension forming an inlet to the refrigerant passage and the header including an inboard land thereon engageable with each of the extensions to axially position the tube passes with respect to the headers for bonding thereto by brazed joints formed between the tube passes and the pairs of headers.

Further objects and advantages of the present invention will be apparent from the following description, reference being had to the accompanying drawings, wherein preferred embodiments of the present invention are clearly shown.

DETAILED DESCRIPTION OF PREFERRED EMBODIMENTS

Figure 1:
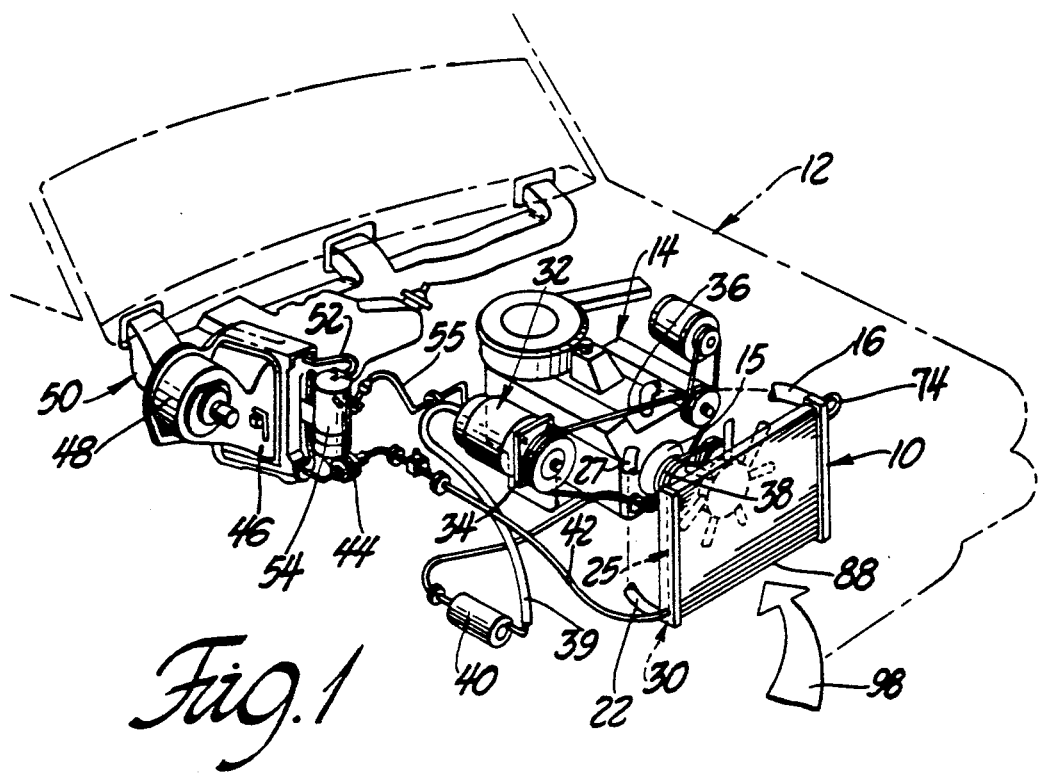
FIG. 1 is perspective view of an automobile coolant system and air conditioning system including the combination radiator and condenser apparatus of the present invention.

Referring now to FIG. 1, a combination radiator and condenser apparatus 10 of the present invention is shown installed in the engine compartment of a motor vehicle 12 having a liquid cooled engine 14. A coolant pump 15 on the engine 14 directs liquid from the coolant passages of the engine for discharge through a radiator hose 16 which connects to an inlet fitting 18 on a radiator inlet tank 20 of the assembly 10. An outlet radiator hose 22 connects to an outlet fitting 24 on an outlet tank 26 and to the coolant jacket inlet 27. A radiator section 25 of the apparatus 10 is provided between the tanks 20 and 26. The radiator section 25 has a frontal flow area for unrestricted flow of the air intake stream of the vehicle through the radiator section 25.

The combination apparatus 10 includes a condenser section 30 which is connected to the discharge of a refrigerant compressor 32. The compressor 32 is driven through an electromagnetic clutch 34 by a belt 36 driven from an engine pulley 38 during engine operation. The compressor 32 discharges refrigerant at high pressure and in gaseous vapor form through a discharge line 39 containing a muffler 40 to the condenser section 30. In accordance with the present invention the condenser section 30 has the same frontal flow area as that of the radiator section 25.

Further, according to one aspect of the present invention, the radiator section 25 and the condenser section 30 share the same air centers for preventing flow disturbances in the air intake stream of the vehicle across parallel tube passes and air centers therein to be described.

High pressure refrigerant vapor condenses in the condenser section 30 and the refrigerant exits the condenser section 30 at high pressure but in a liquid form through a high-pressure liquid line 42. The high-pressure liquid line 42 is connected to a flow restrictor valve assembly 44 installed immediately upstream of an evaporator 46. Air is drawn through the evaporator on the air side thereof by an electric motor driven blower 48 and is blown at a reduced temperature into the passenger compartment through a mode control duct system 50.

Low pressure refrigerant vapor exits the evaporator 46 through a suction line 52 having a accumulator dehydrator unit 54 and is thence returned to the suction inlet of the compressor 32 via line 55. The system thus far described is a conventional system but for the presence of the combined condenser and radiator assembly 10 of the present invention.

In the past the condenser for such refrigerant and air conditioning systems has been a separate unit either located in front of a rearwardly spaced separately manufactured radiator or laterally thereof. In prior art arrangements in which the condenser is mounted in front of a radiator, air centers in the radiator are spaced from the air centers in the condenser or the air centers of the radiator are located out of line with the air centers of the condensers. In either case such spacing or misalignment will cause increases in the pressure drop across the combined apparatus as the inlet air stream of the motor vehicle is directed therethrough.

More particularly, front mounted condensers cause the inlet air stream of the motor vehicle to contract in volume and increase in pressure as the inlet air stream is passed through the air centers of the condenser. Following passage through the condenser air centers the air steam volume expands and then it again contracts in volume as it enters the air centers of the downstream located radiator. Such volume contraction, volume expansion and volume contraction increases the pressure drop from the inlet side to the outlet of the combination apparatus 10 so as to reduce the cooling efficiency of the inlet air stream of the motor vehicle.

Figure 2:
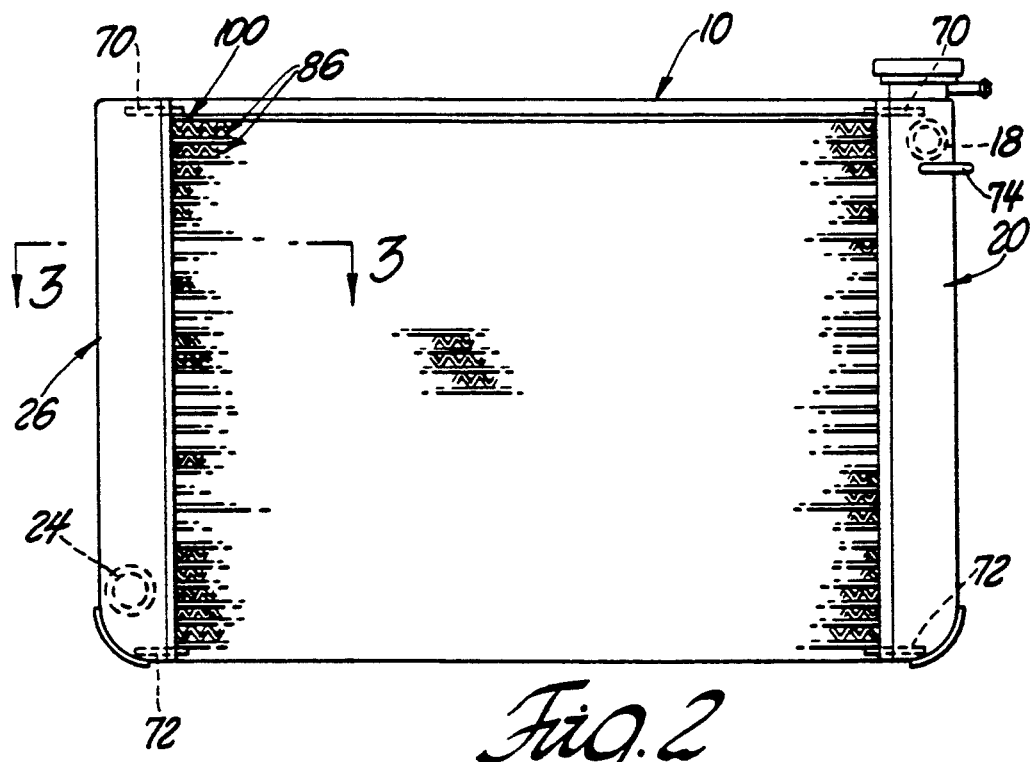
FIG. 2 is an enlarged front elevational view of the combination radiator and condenser apparatus of FIG. 1.
Figure 3:
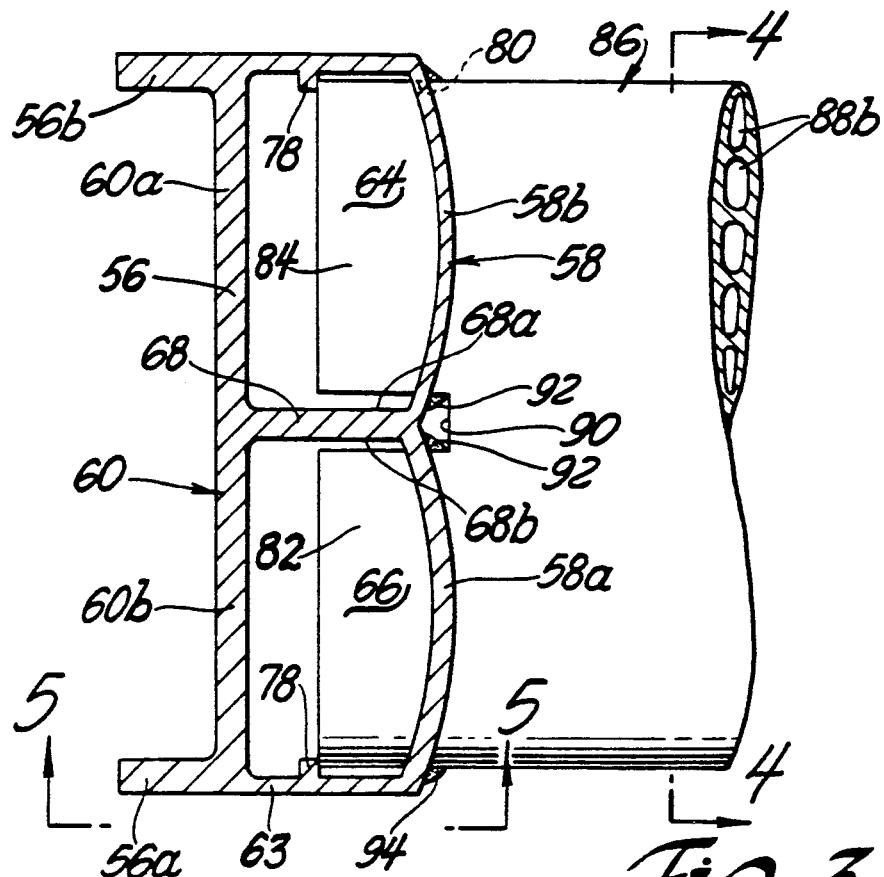
FIG. 3 is an enlarged fragmentary sectional view taken along the line 3—3 of FIG. 2 looking in the direction of the arrows.

As will now be described in greater detail, the inlet tank 20 and the outlet tank 26 are formed as an unitary extrusion 60 having a mounting rail 56 with side flanges 56a and 56b. The extrusion 60 also includes a header 58. The mounting rail 56 and the header 58 are common to both a radiator side 60a and a condenser side 60b of the extrusion 60. In accordance with aspect of the invention the mounting rail 56 and header 58 extend in a compact space saving parallel relationship as seen in FIG. 3. The rail 56 and the header 58 extend through the vertical height of the inlet and outlet tanks 20, 26 shown in FIG. 2. The extrusion 60 has spaced integral side walls 62, 63 integrally joined to the mounting rail 56 and the header 58 to form open ended coolant and high pressure refrigerant chambers or spaces 64, 66. An integral internal partition 68 divides the chambers 64, 66 and seals therebetween. End closures 70, 72 are directed through the header 58 at the top and bottom thereof to close the open ends of the chambers 64, 66.

More specifically the inlet fitting 18 and outlet fitting 24 are connected to the side walls 62 to communicate the coolant hoses 22, 16 with the coolant chambers 64 in the inlet tank 20 and the outlet tank 26. The compressor discharge line 39 is connected by a refrigerant fitting 74 to the side wall 63 to communicate with the high pressure refrigerant chamber 66 in inlet tank 20 and the high pressure liquid line is connected by a refrigerant fitting 76 to the side wall 63 to communicate with the refrigerant chamber 66 in the outlet tank 26.

In accordance with one aspect of the invention, side walls 62, 63 have internal integral tube stops 78 therein and the headers 58 have a plurality of spaced slots 80 on either side of the divider partition 68 so as to be aligned with the tube stops 78. The slots 80 receive end extensions 82, 84 on either end of a common tube extrusion 86 forming a tube pass between the inlet tank 20 and the outlet tank 26. The end extensions 82, 84 engage the tube stops 78 to locate the end extensions 82, 84 in spaced relationship to the mounting rail 56 so as to define a gap 85 therebetween for smooth flow of fluid from the ports of the tube extrusion 86 and the chambers 64, 66.

Figure 4:
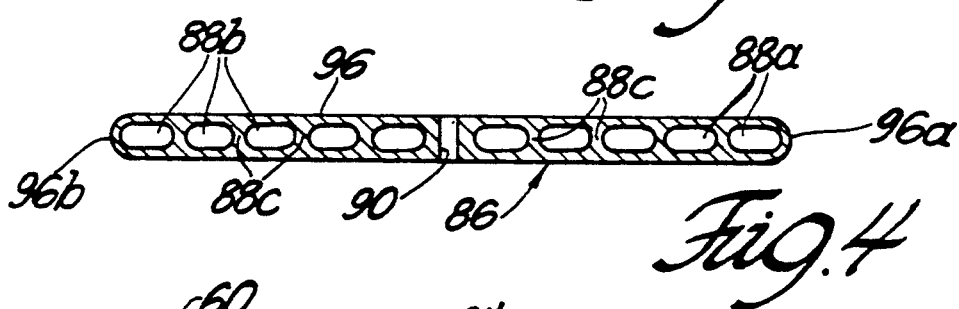
FIG. 4 is an enlarged fragmentary sectional view taken along the line 4—4 of FIG. 3 looking in the direction of the arrows.

As shown in FIG. 4, each of the common tube extrusions 86 has a plurality of flow paths 88a and 88b therein each separated by a web 88c which serve to reinforce the tube extrusion 86 against high pressure refrigerant flow therethrough. In the illustrated embodiment of FIGS. 1–5 the flow paths 88a are five in number and together define a high pressure refrigerant passage with an area suitable for conveying refrigerant between the refrigerant chambers 66 of the inlet tank 20 to the outlet tank 26 without excessive pressure drop therethrough. The flow paths 88b are also five in number and have an area to convey engine coolant between the coolant chambers 64 in the inlet tank and the outlet tank 26. While shown as five in number the flow paths could range in number from four to ten separate flow paths depending upon the width of the tube.

Another feature of the present invention is that the internal partition 68 is seated in a notch 90 formed in the tube extrusions 86. The notch 90 captures the outboard edges 68a, 68b of the partition 68 where the tube extrusion is sealed by a braze joint 92 to seal between the chambers 64, 66. Cladding material on the outer surface of the tube extrusions 86 also serve to form a brazed joint 94 between the tube extensions 86 and the header 58 at the openings 80 therein to prevent header leakage at the tube extrusions 86.

A feature of the present invention is that the same inlet and outlet tanks 20, 26 can be used for different sized radiators merely by cutting different tube lengths and notching the ends to form the aforedescribed interface connection.

Figure 5:
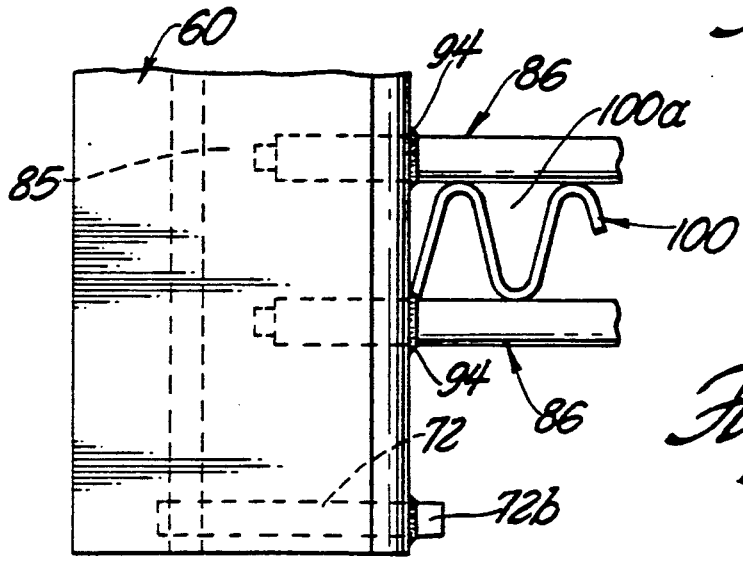
FIG. 5 is an enlarged fragmentary elevational view taken along the line 5—5 of FIG. 3 looking in the direction of the arrows.

Another feature of the present invention is that the tube extrusions 86 have a curved air flow surface 96 including a leading edge 96a which is aligned with the inlet air stream 98 of the motor vehicle. The extrusions 86 also have a trailing edge 96b for discharge of the inlet air stream 98 into the engine compartment of the vehicle after both high pressure refrigerant and engine coolant are cooled by an operation to be described. The curved air flow surface 96 supports common air centers 100 for both the coolant flow and the high pressure refrigerant flow. As shown in FIG. 5, the air centers 100 are sinusoidally curved sheet metal members with peaks and valleys bonded to the surface 96 in conductive heat transfer relationship therewith for removing heat from the refrigerant flow paths 88a during initial low of the inlet air stream 98 through the air center gaps 100a; thereafter the same air center 100 cools the coolant in flow paths 88b.

The aforedescribed common air center and common tube pass arrangement minimizes air pressure drop across the combination radiator and condenser apparatus 10 by eliminating a space between the radiator and condenser in which the inlet air stream can expand after its volume is contracted for flow through the condenser section 30. Once expanded in the gap the inlet air stream in prior art front condenser (and separate condenser) arrangements was again contracted during passage through the radiator unit. Such volume contraction, expansion and contraction cycles and the pressure drop attendant thereto are eliminated by the use of the common air center 100 of the present invention.

While the common air center 100 is illustrated as a single unit it can have a forward segment and an aft segment if desired but in both cases the center gaps 100a are maintained continuous from the condenser section 30 through the radiator section 25 so as to either eliminate or effectively reduce the aforedescribed contraction/expansion cycles.

Another aspect of the invention is that the tube passes can be formed to have a separate tube section for the coolant and a separate tube section for refrigerant. The advantage of such arrangements is that the condenser tube segment can have a thicker wall thickness to contain the higher pressure of the high pressure refrigerant, e.g., 1200 psi versus 20 psi on the coolant side of the tube pass. Also a similar feature of an extruded tank 60 is that the extrusion die can form different thickness walls, e.g., a header wall portion 58a for containing the pressure in refrigerant chamber 66 can be thicker than the header wall portion 58b for containing the lower pressure in the coolant chamber 64. For example the condenser side header wall thickness could be in the order of 1.5 times the thickness of the header wall portion 58b, which in one representative proposal is a header thickness for the radiator side of 2 mm and is a condenser side header wall thickness of 3 mm. Suitable materials for containing such pressures at such thicknesses includes 3003 aluminum alloys with a plasma sprayed coating of anyone of 4343, 4045, 4047 silicon aluminum alloy which is only sprayed onto the external header surface from 3 to 10% of the header wall thickness. This material and thickness of walls are only illustratively included herein with it being understood that other extrudable materials an thicknesses of header material are contemplated within the invention as set-forth in the appended claims.

In another aspect the use of separate tubes for each of the coolant and refrigerant passages can be either in the form of two extruded tubes, two sheet metal fabricated tubes or a combination of an extruded tube and a sheet metal tube.

Figure 6:
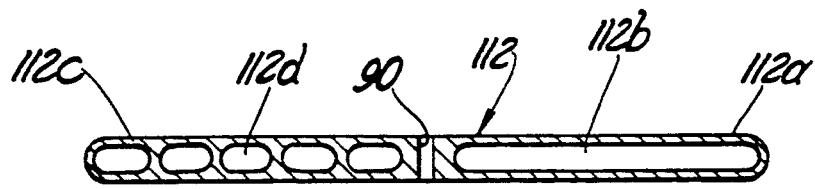
FIGS. 6-9 are sectional views of other embodiments of flow tubes for use in the FIG. 2 embodiment.

In FIG. 6 a common extruded tube 112 is shown having a coolant flow portion 112a with a single coolant passage 112b. The tube 112 has a refrigerant flow portion 112c with a plurality of separate refrigerant flow paths 112d separated by reinforcing webs formed integrally of the tube 112. The resultant structure defines a tube especially configured for use with a single air center and configured for reinforcing the high pressure refrigerant flow contained therein.

Figure 7:
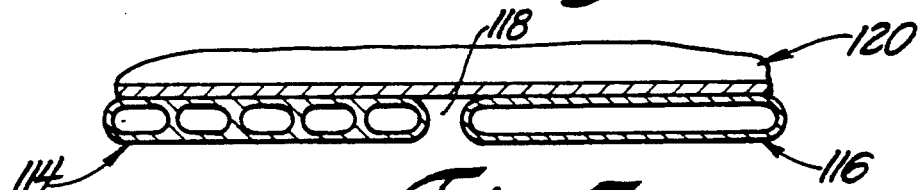

In FIG. 7 the tube pass is shown as separate extruded tubes 114 and 116 separated by a thermal gap 118 which prevents direct heat transfer between flow through a single coolant passage in coolant tube 116 and multiple passages 114a in the refrigerant tube 114. A single air center 120 can be located across the separate extruded tubes 114, 116 for extracting heat from both refrigerant and coolant flows as set-forth above and without excessive pressure drop because of repeated contraction, expansion contraction of the volume of the inlet airstream as it is directed across the combination apparatus of the present invention.

Figure 8:
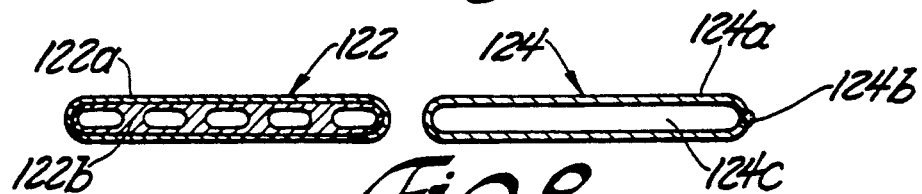

In FIG. 8, two separate tubes sheet metal fabricated tubes 122, 124 are provided. The tube 122 has an outer sheet metal skin 122a and the tubes are formed by a multi hole insert 122b. The tube 124 has a formed outer sheet 124a with a welded seam 124b closing the sheet 124a to form a single opening 124c for flow of coolant.

Figure 9:
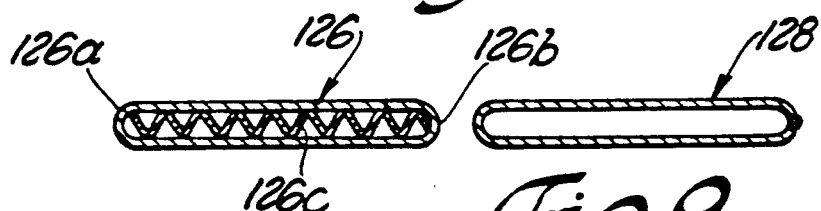

In FIG. 9 two separate sheet metal fabricated tubes are shown including a refrigerant tube 126 having an outer sheet metal skin 126a with a weld seam 126b. A separate sinusoidal insert 126c is located inside the tube 126 to form a plurality of refrigerant passages and to reinforce the outer skin 126a. The coolant tube 128 is like the coolant tube 124 in the FIG. 8 embodiment.

In all cases a compact tube pass arrangement is provided which is readily incorporated in assembled sealed relationship with extruded tanks having separate coolant and refrigerant chambers therein. The use of fabricated tubes with two sections enables the most economical thin tube thickness be used for coolant retention and thicker tubes be used for high pressure retention in the refrigerant section. The common tube versions and separate tube versions are both equally useable in the extruded tank apparatus of the present invention and both arrangements are equally suitable for use with common air centers whether in the form of a single air center or in the form of two air center segments arranged so as to prevent undesirable pressure drop thereacross because of contraction, expansion and contraction cycles as previously discussed.

Figure 10:
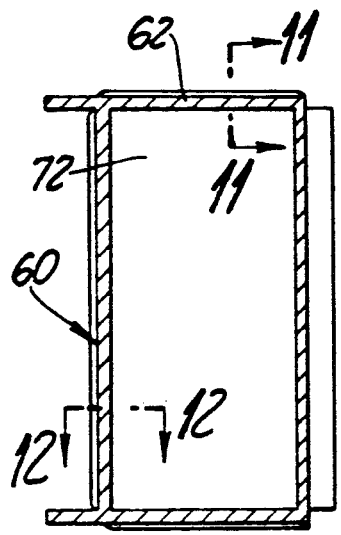
FIG. 10 is a sectional view showing a three sided pocket for a partition in the embodiment of FIG. 2.
Figure 11:
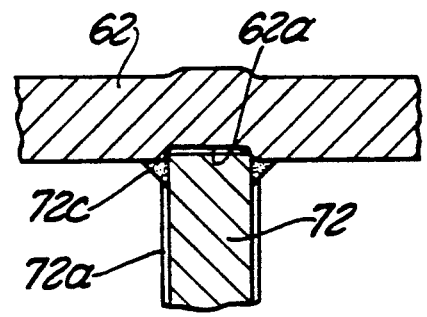
FIG. 11 is an enlarged fragmentary sectional view of region 11 in FIG. 10.
Figure 12:
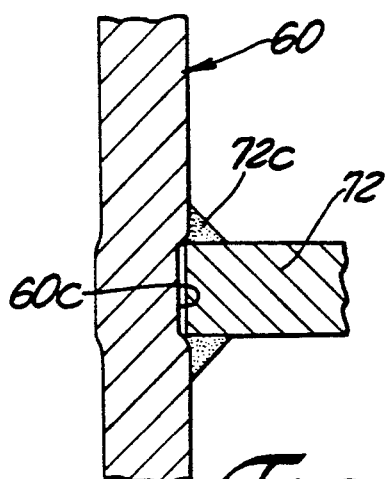
FIG. 12 is an enlarged fragmentary sectional view of circled region 12 in FIG. 10.

Another feature of the present invention is the manner in which the end closures 72 are seated in the extruded tanks 60 of the present invention. As seen in FIGS. 10-12 each of the side walls 62, 64 have cold extruded channels 62a, 64a formed therein to receive the side walls of the end closures 72 when they are inserted through the access slots 80. Additionally, the mounting rail 60b is cold extruded to form a pocket or channel 60c for capturing the end of the end closure 72. In accordance with the invention the end closure 72 has a cladding 72a of a suitable brazing compound which bounds to the extruded tank at the pockets 62a, 64a, and 60c to form a three pocket sealed joint that both reinforces the extruded tank 60 at the ends thereof which sealing the compartments 64, 66 at opposite open ends of the tank 60. The end closure 72 has an end 72b thereon which is located on the inboard side of the header 58 as shown in FIG. 10. The end 72b is sealed by a braze fillet 72d like the braze fillets 72c around the three sided extruded pockets. The access slots 80 are formed by a slitting process to be described and the extruded pockets are formed by a tool the same size as the end closure or the condenser partition for multi pass sinusoidal flow. The tool simultaneously forms the three pockets. The sizing operation of the tool forms a pocket which eliminates the variability produced by extrusion die wear which can cause slight differences in the size of an extruded tank and partition or end closure parts inserted therein. The three pocket retention additionally defines a structure which has more burst strength to resist the high pressure refrigerant forces within the chamber 66.

Another feature of the present invention is that the tube pass to tank configurations can vary according to the volume requirements of the refrigerant flow circuit and the coolant flow circuit.

Figure 13A:
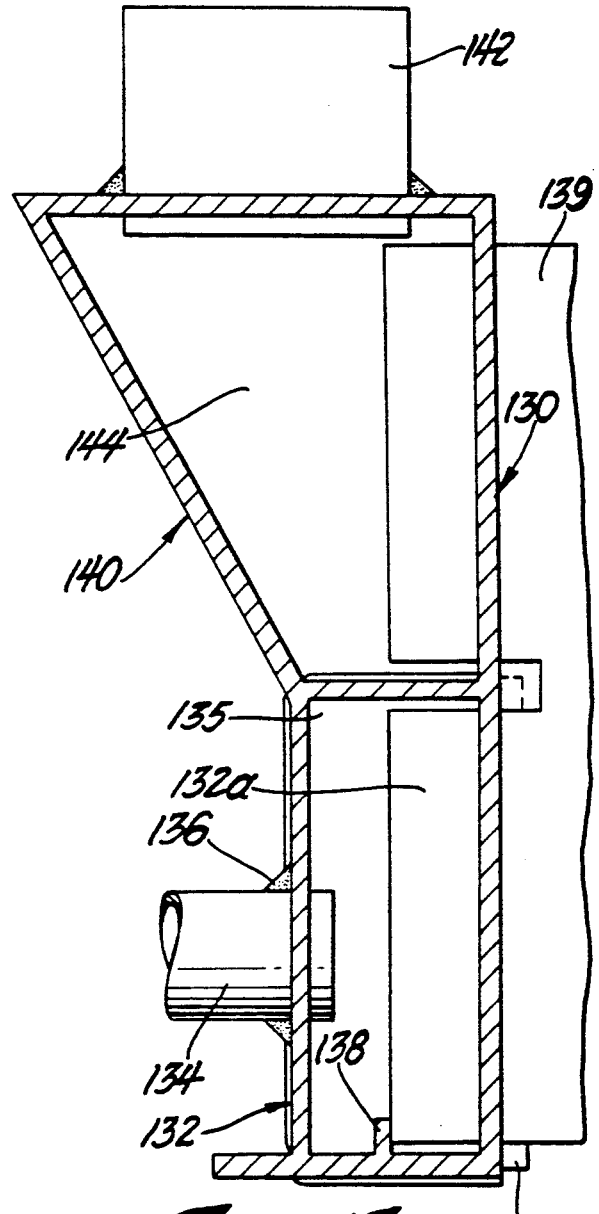
FIGS. 13a–13c are sectional views of other extruded tank embodiments of the present invention.

In the embodiment of FIG. 13a, an extruded tank 130 is illustrated in which a condenser tank 132 is provided having an inlet refrigerant fitting 134 connected thereto by a braze fillet 136. The condenser tank 132 has a tube stop 138 and it receives the end extensions of a plurality of tube passes directed to a like extruded coolant tank in a second extruded tank located at the opposite end of the tube passes. One of the tube passes 139 is shown seated against the stop 138. The extruded tank 130 also includes an integral radiator tank 140 having a pipe 142 connected thereto for flow of coolant through a coolant chamber 144. While braze fillets are shown at the connections between the tank 130 and the various pipes and tube passes, the connections can be formed by welds if desired or by other known sealed connection techniques.

In accordance with one aspect of the invention the cross-section of the fluid chamber 132a in the condenser tank 132 is smaller than the cross-section of the coolant chamber 144 to optimize the quantity of refrigerant used to cool the automobile interior. In order to prevent flow throttling of the refrigerant as it passes from pipe fitting 134 to chamber 132a thence through the tube passes 139, the flow area of the tubes between the separators in the condenser chamber 132 are equal in area to the cross sectional flow area of the chamber 132a. Such equal area or substantially equivalent areas between the cross-section of the chamber 132a and the serpentine group of tube passes balances the system flow to optimize refrigerant use. The condenser partitions are like closure cap 72, one being shown in FIG. 13a at 135.

Figure 13B:
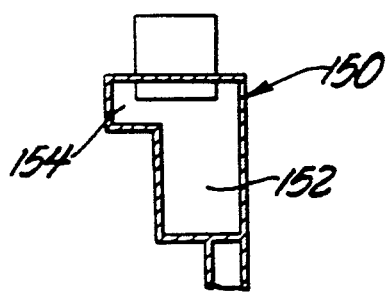
Figure 13C:
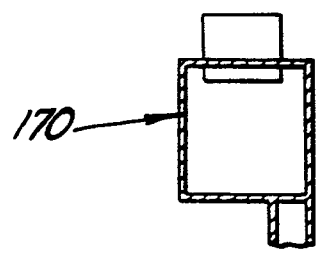

The embodiments of FIGS. 13b through 13c show other ways to vary the coolant chamber volume in the radiator tank portion of an extruded combination radiator and condenser tank. FIG. 13b shows a combination tank 150 having an extruded radiator tank 152 with an offset volume increasing rectangular extruded portion 154. FIG. 13c shows a single rectangular (tending toward square) sectioned radiator section 170.

In another aspect of the invention the extruded combination radiator and condenser tank can be modified to include integral tubes for directing engine oil with respect to the engine coolant for transmission oil cooling. At present transmission oil coolers are positioned inside the outlet tank of the radiator so as to utilize the heat capacity of the engine coolant to cool the transmission oil passing through the transmission oil cooler.

Figure 14:
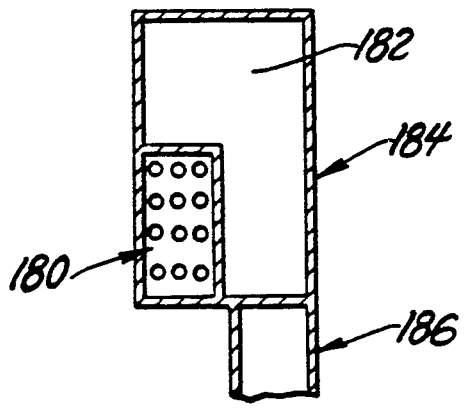
FIGS. 14–17 are sectional views of extruded tank embodiments having integral oil cooler tubes formed integrally of the extruded tank.
Figure 15:
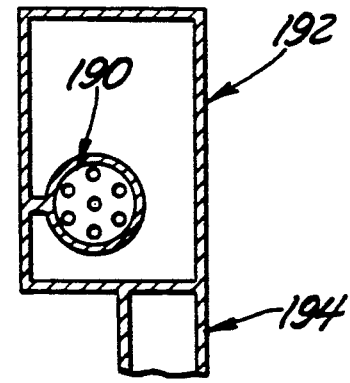
Figure 16:
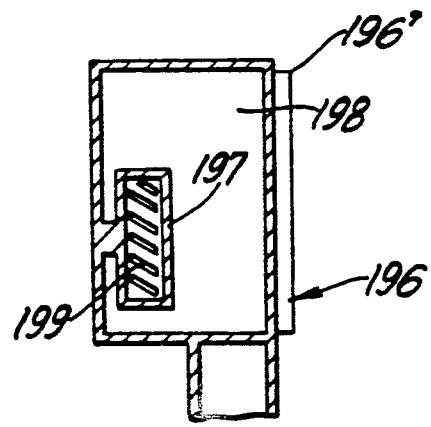

In the embodiment shown in FIG. 14 the extruded rectangular cross-section is formed by the extrusion die to form a plurality of oil cooler tube passes 180 in a coolant chamber 182 of a radiator tank 184 in a combination radiator and condenser unit 186. The tube passes 180 are connected at opposite ends by suitable fittings (not shown) to the transmission oil circuit. FIG. 15 shows an extrusion of circular cross-section forming a group of tube passes 1190 directed through a coolant tank 192 of a combination radiator and condenser tank 194. FIG. 16 shows a combination radiator and condenser tank 196 with an extruded tube 197 formed integrally of the extruded coolant tank portion of the combination tank 196. The extruded tube defines a transmission oil passage through the coolant tank 198. A fin type turbulator 199 is inserted in the extruded tube 197 for improving heat transfer between the oil and coolant in the radiator coolant tank 198. In this embodiment end separator caps 196' are provided to block the ends of both the coolant tank 198 and the ends of the transmission oil cooler. The separator caps 196' are seated in three pocket openings as previously described in the earlier embodiments.

Figure 17:
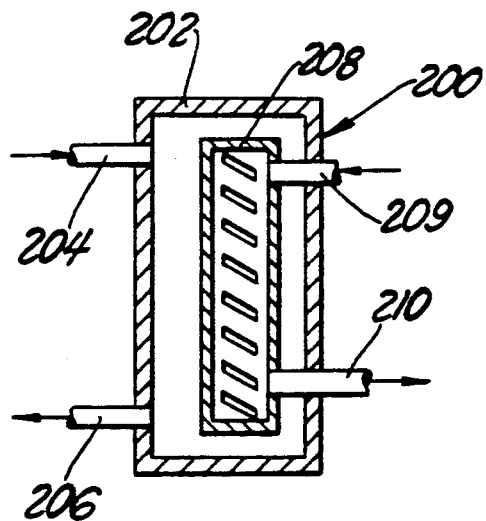

FIG. 17 shows another embodiment of a combination extruded radiator and transmission oil cooler 200 which can be mounted exterior of combination extruded radiator and condenser tanks shown in the embodiments of FIGS. 14-16. The exterior unit has a radiator coolant section 202 which is connected to the radiator section of the combination tank by pipes 204, 206. An integral extruded transmission oil cooler section 208 has pipes 208, 209 for connecting the transmission cooler section to the transmission oil circuit.

Figure 18:
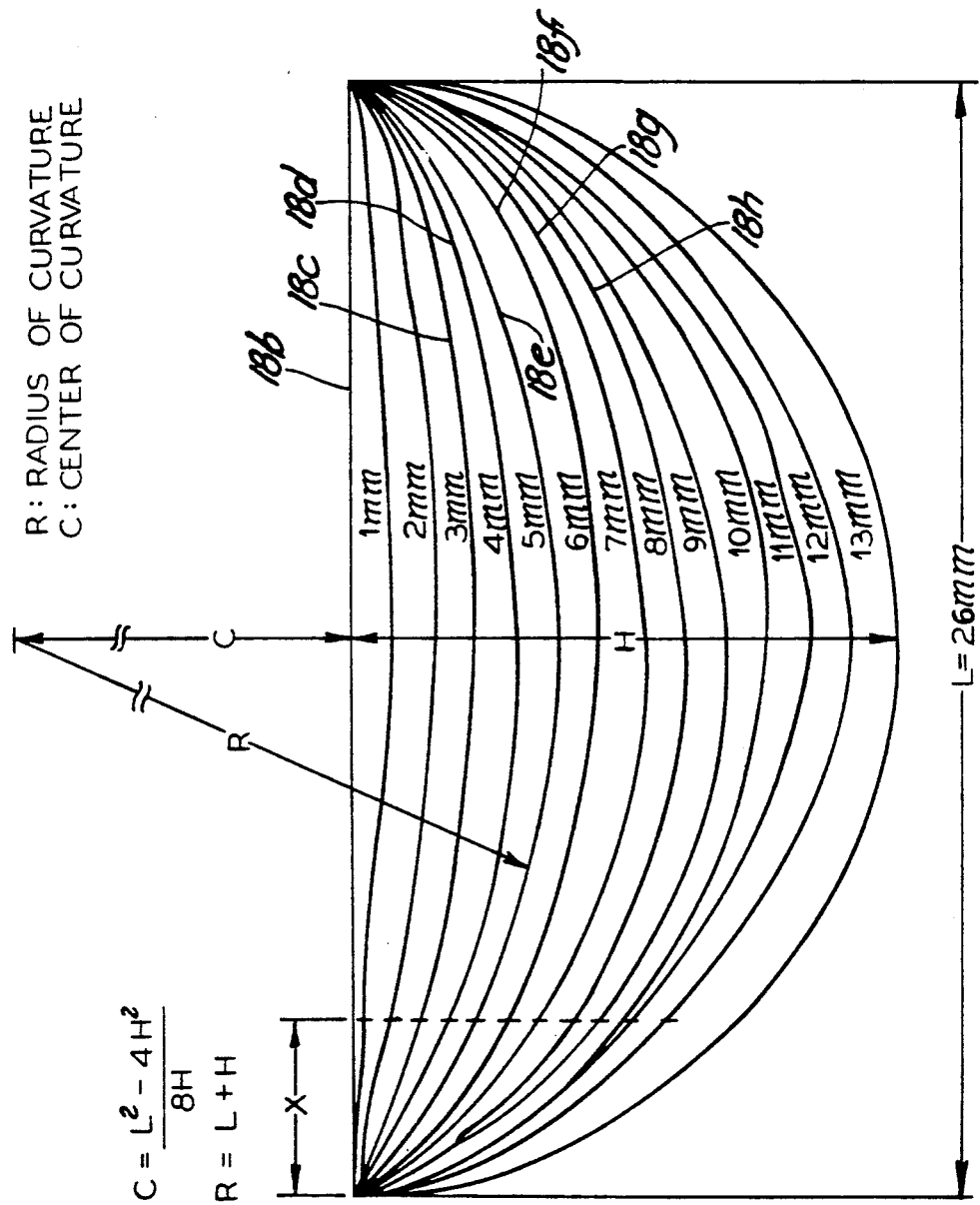
FIG. 18 is a chart for selection of optimal header curvature in the extruded tanks of the present invention.

Another feature of the invention is that the header segments 58a and 58b are selected to have a radius to optimize the burst strength of the extruded tank. The chart in FIG. 18 shows a range of header configurations tested for strength. Curve 18a represents a half circle beam; curve 18b represents a flat beam. In accordance with test results, it has been determined that segments 58a and 58b have the greatest burst strength for bends in the range of curves 18c-18d, e.g., with radii from 20-60 mm.

Figure 19:
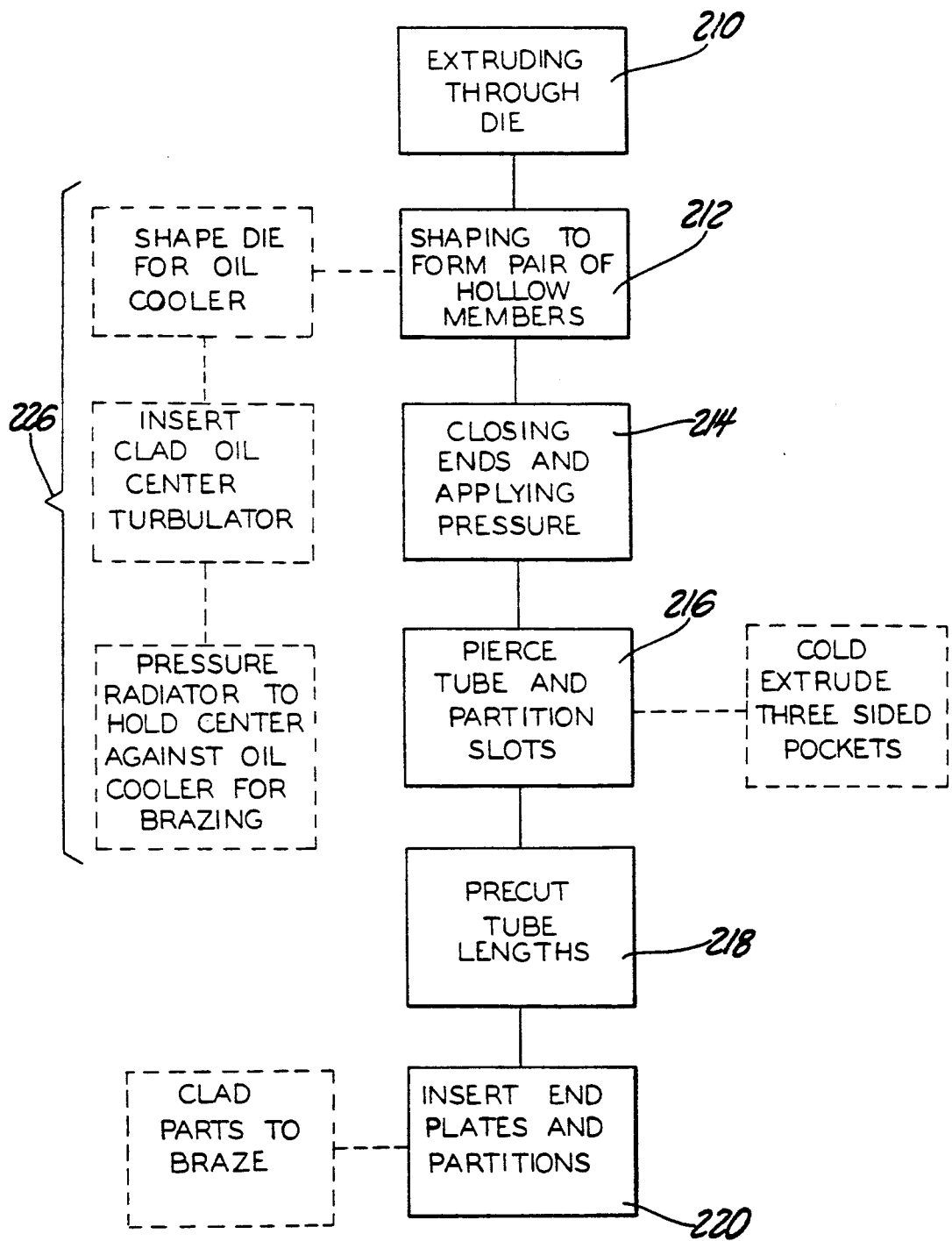
FIG. 19 is a flow chart of the method of the present invention.

Still another aspect of the present invention is an improved method for assembly a combination radiator and condenser assembly as shown in the process chart of FIG. 19. The first step designated in process block 210 includes the step of directing an extrudable material through an extruding die; shaping the extruding die as designated in block 12 to form a pair of elongated hollow members each having open ends with a longitudinal internal partition joined to a header wall; then closing the ends of the hollow members and as designated by block 214 applying hydraulic pressure to the two chambers to form a support for the header wall; and thereafter providing a step as designated by block 216 to pierce a plurality of tube slots in the header wall, a pair of end closure slots in the header wall and a plurality of multi pass partition slots in the header wall only at the header wall portion which forms one of the chambers; as designated by block 218 the next step includes precutting a plurality of tube lengths and inserting the tube lengths into the tube slots of a pair of spaced elongated members; block 220 includes the step of inserting end closures in the end closure slots to close the open ends and inserting partitions in the multi pass partition slots to divide one of the chambers to form a serpentine flow path in tube lengths connected to the one of the chambers, this step is designated as an alternative step in the process.

Another alternative step in the method of assembly of the invention is to seal the joined parts by providing a cladding on each of the joined parts and brazing them to form a sealed brazed joint therebetween as designated in alternative step block 222.

Another alternative step in the method of assembly of the invention is designated by alternative step block 224 which includes the step of cold extruding three surfaces of the inner wall o the extruded tank to form a three sided pocket for each of the partitions and each of the end closures and extending an end of the partition outwardly of the extruded tank to form a support surface for the sealed joint between the header and the joined parts. This step compensates for dimension variations produced as the extrusion die wears. The pockets combine with an oversized closure member to take up changes in the wall dimensions of the extruded tank.

Still another alternative step in the method of assembly is to shape the extrusion die to form an integral transmission oil cooler pipe in the extruded tank and providing an inserted turbulator therein; coating the turbulator with a brazing cladding; thence pressuring a coolant tank in the extruded tank to collapse the oil cooler wall onto the inserted oil center for maintaining a pressure contact thereon for brazing the cladding to the inner surface of the oil cooler wall all as designated by alternative step block 226.

Operation of the embodiment of FIGS. 1–4 includes directing either fan induced or ram jet air as inlet air stream flow against the leading edges 96a of the tubes 86. The inlet air stream is passed across the flow surface 96 and through the common air centers 100 which are bonded to the surface 96 for simultaneously removing heat by conductive heat transfer through the same air center element from both the radiator section 25 and the condenser section 30. In the case of the radiator section 25, heat is removed from the coolant being circulated through the flow paths 88b by flow of coolant from the radiator inlet hose 16, thence through the inlet fitting 18, the coolant chamber 64 thence into the radiator section of the outlet tank 26. From tank 26 the return coolant passes through the outlet fitting 24 and the return radiator hose 22 to the coolant jacket inlet 27. Simultaneously, if the air conditioning is turned on the electromagnetic clutch 16 is energized by suitable control means of a conventional form well known in the art. The compressor 32 is thereby directly coupled to the engine output for compressing refrigerant vapor from the evaporator 46 and discharging the refrigerant vapor into the high pressure refrigerant vapor space 66. The refrigerant vapor is then passed through the tube pass 86 at the flow paths 88a therein where the vapor is cooled by direct conductive heat transfer to the common air centers 110 for extracting heat from the coolant in passages in flow paths 88a.

The conductive heat transfer for both coolant and refrigerant is from the tubes 86 at the outer surface 96. The conductive heat transfer causes the high pressure refrigerant vapor to cool and condense into high pressure liquid which is collected and expanded across the expansion valve 44 for cooling the air flow across the evaporator 46.

Having described preferred embodiments of the combination condenser and radiator assembly of the present invention according to the present invention and in a particularly useful application thereof, it will be understood by those skilled in the art that the desired application and embodiments are obtained by a very compact arrangement of a few easily assembled parts which enable a combination assembly to be used either for air conditioning or non air conditioning applications. In such preferred constructions there is basically one common tube member which serves to flow both coolant and refrigerant at the same time if desired. But it will be understood by those skilled in the art that the above-described preferred embodiments are illustrative of the invention and may be modified within the scope of the appended claims.

What is claimed is:

1. A method for assembling a combination radiator and condenser assembly comprising the steps of:

extruding an extrudable material through an extruding die to form a pair of elongated hollow members each having open ends with a longitudinal internal partition separating each elongated hollow member into two chambers formed in part by a header wall and wherein the chambers each communicate with the open ends;

piercing a plurality of tubes slots in the header wall; piercing a pair of end closure slots in the header wall; and piercing a plurality of multi pass partition slots in the header wall only at the header wall portion which forms one of the chambers;

precutting a plurality of tube lengths;

assembling the tube lengths to the elongated hollow members by inserting each one of said tube lengths into one of said corresponding tube slots;

providing end closures;

assembling the end closures to the elongated hollow members by inserting each one of said end closures into one of said corresponding end closure slots to close the open ends; and providing partitions; and assembling the partitions to the elongated members by inserting each one of said partitions in one of said corresponding multi pass partition slots to divide one of the chambers to form a serpentine flow path in the tube lengths connected to the one of the chambers.

2. The method of claim 1 including the step of sealing the assembled parts by providing a braze material and flux cladding on each of the assembled parts and brazing them to form a sealed brazed joint therebetween.

3. The method of claim 1 including the step of cold extruding three surfaces of each of the hollow members to form a plurality of three sided pockets therein; providing an exposed end on said end closures and sealing each of the partitions and each of the end closures in the three sided pockets and brazing the exposed end of said end closures to form a sealed joint between the header wall and the assembled parts.

* * * * *